Feb. 28, 1928.
H. LORCH
ANTISKID DEVICE
Filed April 29, 1926
1,660,798
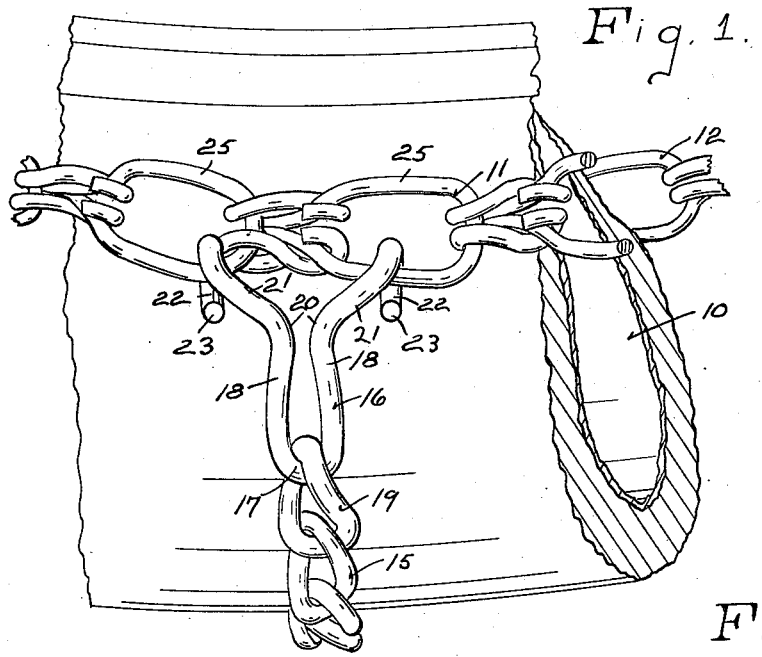
Fig. 1.
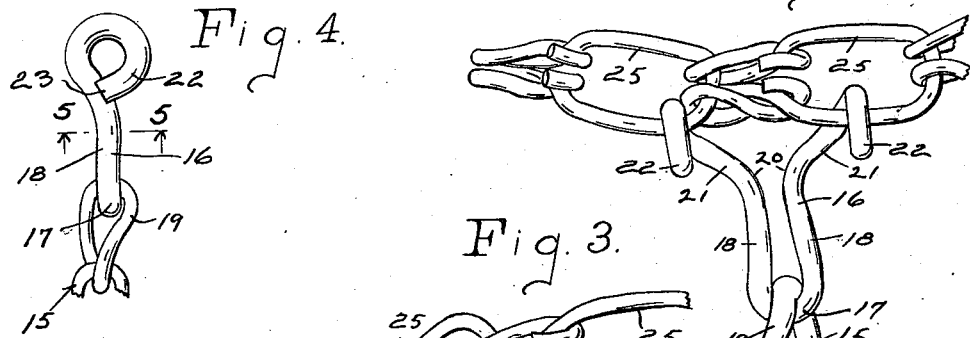
Fig. 2.
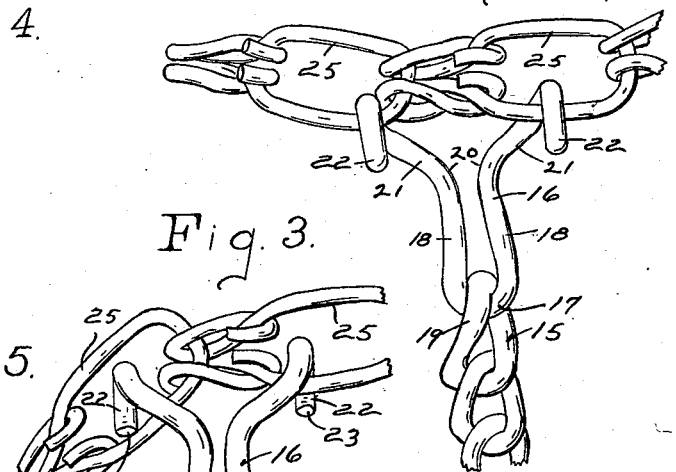
Fig. 3.
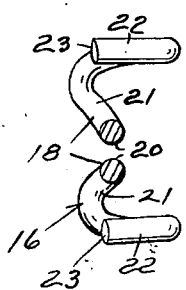
Fig. 4.
Fig. 5.
INVENTOR.
Henry Lorch
BY
Erwin, Wheeler & Woolard
ATTORNEYS Patented Feb. 28, 1928.

1,660,798

UNITED STATES PATENT OFFICE.

HENRY LORCH, OF MILWAUKEE, WISCONSIN.

ANTISKID DEVICE.

Application filed April 29, 1926. Serial No. 105,414.

This invention relates to improvements in anti-skid devices.

In anti-skid devices or tire chains such as involve peripherally extending side chains connected at intervals by cross chains, there are many problems resulting from wear of the cross chains. As soon as the cross chains become worn their outer surfaces are flattened by the wear and their effectiveness in gripping wet or icy surfaces is greatly diminished. Secondly, the wear will ultimately result in breakage of the cross chain. In either event, replacement requires the use of special tools and equipment and usually requires that the entire anti-skid device be removed from the tire for the purposes of repair.

It is the object of this invention to provide a special type of cross chain which can be attached to or removed from a standard anti-skid device in a few seconds and without any tools; which may be used with either side outward so that when the surface of one of its sides becomes worn it may be inverted to present a fresh and unworn set of surfaces to the road; which may be attached or removed from the anti-skid device while the same is in place about the tire or casing of the motor vehicle rim; and which may be used either side up without in any way injuring the casing.

In the drawings:

Figure 1 is a side elevation of the device embodying this invention as applied to a tire or casing.

Figure 2 is a similar view of the device showing the cross chain inverted.

Figure 3 is a view similar to Figure 1 showing the manner in which the chains are manipulated to release the cross chain from interlocking engagement with the peripheral chain of an anti-skid device.

Figure 4 is a side elevation of the attaching means for the cross chain.

Figure 5 is a tilted view of the attaching means taken on a section indicated at 5—5 in Figures 3 and 4.

Like parts are identified by the same reference characters throughout the several views.

The automobile casing or tire is represented at 10 and is encircled at both of its sides by peripheral chains 11 and 12. As usual, the peripheral or side chains are joined across the periphery of the tire by cross chains 15. This invention relates peculiarly to the manner in which each cross chain is connected by a special attachment fitting or double link 16 to the side chains.

The double link or attachment fitting 16 is used at each end of each cross chain. Its intermediate portion is bent double at 17 to provide shank members 18 which embrace the last link 19 at the end of the cross chain proper and are brought close enough together at 20 to maintain their engagement with such link.

The shanks 18 are bent at 20 to diverge rather sharply from each other as at 21. Shank portions 21 are also arcuately curved as shown in Figure 4 and the curve is continued in the form of a laterally open hook 22.

The extremities 23 of the device are carried around sufficiently far so that in side elevation each part of the attaching fitting presents the appearance of a closed eye as shown in Figure 4. As clearly appears in Figure 5, however, each such extremity 23 is offset from the adjacent shank portion 21 for a sufficient distance to permit the ready manipulation therethrough of the individual links 25 of the peripheral chains. The space between the two hooks 22 is such that they are adapted to engage consecutive links and thereby to divide the strain transmitted from the cross chain to the peripheral chain.

Figure 3 shows the manner in which the peripheral chain is distorted slightly so that its component links may be caused to pass through the open hook portion of an attaching fitting such as has been described above. The distortion is exaggerated in the view for the reason that in practice the fitting itself would be manipulated out of the plane of the picture to facilitate the release of the parts. The space between the extremities 23 of the two hooks and the adjacent shank portions 21 thereof most clearly appears in Figure 5, but it will be noted from Figure 4 that the arrangement is such that in neither position of the fitting will the extremities 23 thereof gouge the rubber walls of the casing or tire. To this end the hook is, as viewed in side elevation in Figure 4, symmetrical with reference to the plane in which shank portions 18 are disposed and each of the extremities 23 of the hooks lies substantially in said plane.

With this device a cross chain may be used with either side outermost so that as soon as one side becomes worn the chain may be inverted to present a fresh gripping surface. The change may be made while the anti-skid device is in place on the tire and the engagement and disengagement of the ends of the cross chain from the peripheral chain can be accomplished manually in a few seconds time. This is true regardless of which side of the cross chain is outermost. It will be noted that to carry out the purposes of the invention in this regard, the hooks have a partially helical curve somewhat like that of a ram's horns, the two hooks being curved in opposite directions from the center of the fitting.

The fact that the two hook portions 22 of the attaching fitting are circumferentially spaced to engage two consecutive links of the peripheral chain is important in that it not only divides and equalizes the strain of the cross chains on the peripheral chains, but, furthermore, gives stability to the fitting and renders it more secure in its engagement with the peripheral chains. Due to this arrangement there is almost no possibility of accidental disengagement of the parts, while at the same time the manual manipulation of the parts is extremely simple.

It will be seen, therefore, that the device herein disclosed satisfies the objects of this invention.

I claim:

In an anti-skid device for vehicle wheels including peripheral and cross chains, an attachment fitting comprising a strand bent double intermediate its ends to embrace a link of one of said cross chains and to provide converging shank members, each shank member being bent to provide sharply diverging shank portions, each diverging shank portion being bent at its extremity to form thereon laterally opening hooks, to permit the fitting to be detachably secured to a pair of interconnected links of one of said peripheral chains.

HENRY LORCH